(12) United States Patent
Wu

(10) Patent No.: US 6,361,112 B1
(45) Date of Patent: Mar. 26, 2002

(54) HEADREST FOR SIMPLE-STRUCTURED SEAT

(75) Inventor: Donald P. H. Wu, Hsin Feng Hsiang (TW)

(73) Assignee: Pihsiang Machinery Co., LTD, Hsinchu (TW)

( * ) Notice: Subject to any disclaimer, the term of this patent is extended or adjusted under 35 U.S.C. 154(b) by 0 days.

(21) Appl. No.: 09/639,316

(22) Filed: Aug. 15, 2000

(51) Int. Cl.⁷ .................................................. A47C 7/36
(52) U.S. Cl. ...................................... 297/391; 297/410
(58) Field of Search ................................. 297/391, 410

(56) References Cited

U.S. PATENT DOCUMENTS

| | | | | |
|---|---|---|---|---|
| 3,512,605 A | * | 5/1970 | McCorkle | 297/391 |
| 4,489,979 A | * | 12/1984 | Zyngier | 297/391 |
| 6,007,154 A | * | 12/1999 | Parker et al. | 297/410 |

* cited by examiner

Primary Examiner—Anthony D. Barfield
(74) Attorney, Agent, or Firm—Pro-Techtor International Services

(57) ABSTRACT

A headrest for simple-structured seat is provided. The headrest includes at least one pair of bar receivers and at least one pillow. Each of the bar receivers includes two wing portions and defines an insertion hole between the wing portions. The wing portions are provided with a plurality of fixing holes via which screws may be threaded into a rear side of a back of the seat so as to connect the bar receivers to the back of the seat. The pillow includes at least one pair of elastic bars downward projected therefrom for inserting into the insertion holes defined by the bar receivers on the back of the seat. The elastic bars automatically extend outward to tightly press against inner walls of the insertion holes and thereby firmly hold the pillow of the headrest to the back of the seat. The headrest may be easily installed on a seat for all kinds of vehicles.

16 Claims, 17 Drawing Sheets

US 6,361,112 B1

HEADREST FOR SIMPLE-STRUCTURED SEAT

BACKGROUND OF THE INVENTION

The present invention relates to a headrest for a simple-structured seat, and more particularly to a headrest designed for easily mounting on a back of a seat equipped on an electric cart.

Cars have become very important traffic means in the modern society, particular in cities. With the increasing requirement for environmental protection, there is also developed an electric cart that not only enables reduced environmental pollution but also has reduced dimensions and weight compared with the common cars and motorcycles. Such electric cart can be easily operated and is therefore widely welcome and employed by the invalid and the aged to conveniently assist them in moving usually within a short distance.

A seat is a very important part of the electric cart. A well-designed seat enables a driver to steer the electric cart comfortably and safely. To provide drivers of electric carts with a comfortable seat, the seat of an electric cart usually includes an internal metal framework that has complicate structure and increases the manufacturing cost of the seat. Both U.S. Pat. Nos. 5,904,214 and 5,941,327 disclose an electric cart onto which a seat is mounted. However, these prior inventions do not discuss the seat in details. Nevertheless, a seat with simplified structure and accordingly reduced manufacturing cost would apparently be beneficiary to the development of the electric cart in the vehicle market. Moreover, it is very important for the seat of an electric cart to meet the requirements of different drivers.

FIG. 25 shows a conventional seat A for an electric cart. The seat A includes a back 1A that can be adjusted in its inclination relative to a bottom 2A of the seat A to allow a driver to comfortably rest his or her back on the back 1A while steering the electric cart. However, the back 1A of the seat A does not include a headrest, and this would, of course, cause discomfort to the driver, particularly when the drivers of electric carts are usually the invalid and the aged.

Since the seat A of the currently commercially available electric cart usually has a back 1A that is made in the cart manufacturer's factory with a fixed mold. To add a headrest to the back 1A, it necessitates a new mold or a modified mold and would therefore increase the manufacturing cost of the electric cart. On the other hand, a headrest made and fixed by the cart manufacturer onto the back 1A of the seat A for the electric cart does not necessarily meet the requirement and/or preference of all drivers.

SUMMARY OF THE INVENTION

It is therefore a primary object of the present invention to provide a headrest for a simple-structured seat for, for example, vehicles and electric carts, wherein the headrest includes simple means for mounting on the seat, so that the headrest can be removably connected to the seat in a convenient and quick manner, allowing a driver to comfortably rest his or her head on the headrest during driving.

Another object of the present invention is to provide a headrest for a simple-structured seat for, for example, vehicles and electric carts, wherein the headrest can be manufactured and sold as a package product for consumers to mount the headrest to the seat with minimum time and effort.

A further object of the present invention is to provide a headrest for a simple-structured seat for, for example, vehicles and electric carts, wherein the headrest may be differently designed and can be easily mounted onto and removed from the seat that was not initially provided with a headrest, so that consumers may purchase and replace the headrest according to their preference.

To achieve the above and other objects, there is provided a headrest for a simple-structured seat for cars, particularly electric carts. The headrest includes at least one pair of bar receivers for mounting on a rear side of a back of the seat. The bar receiver each has two wing portions on which a plurality of fixing holes are provided. Fastening means, such as screws, are threaded through the fixing holes to fix the bar receivers onto the back of the seat, so that an insertion hole is defined between the bar receiver and the back of the seat. The headrest also includes at least one pillow that has at least one pair of elastic bars downward projected therefrom and adapted to insert into the insertion holes defined between the bar receivers and the back of the seat. The elastic bars automatically extend outward to tightly press against inner walls of the insertion holes in the bar receivers and thereby firmly hold the pillow to the back of the seat.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
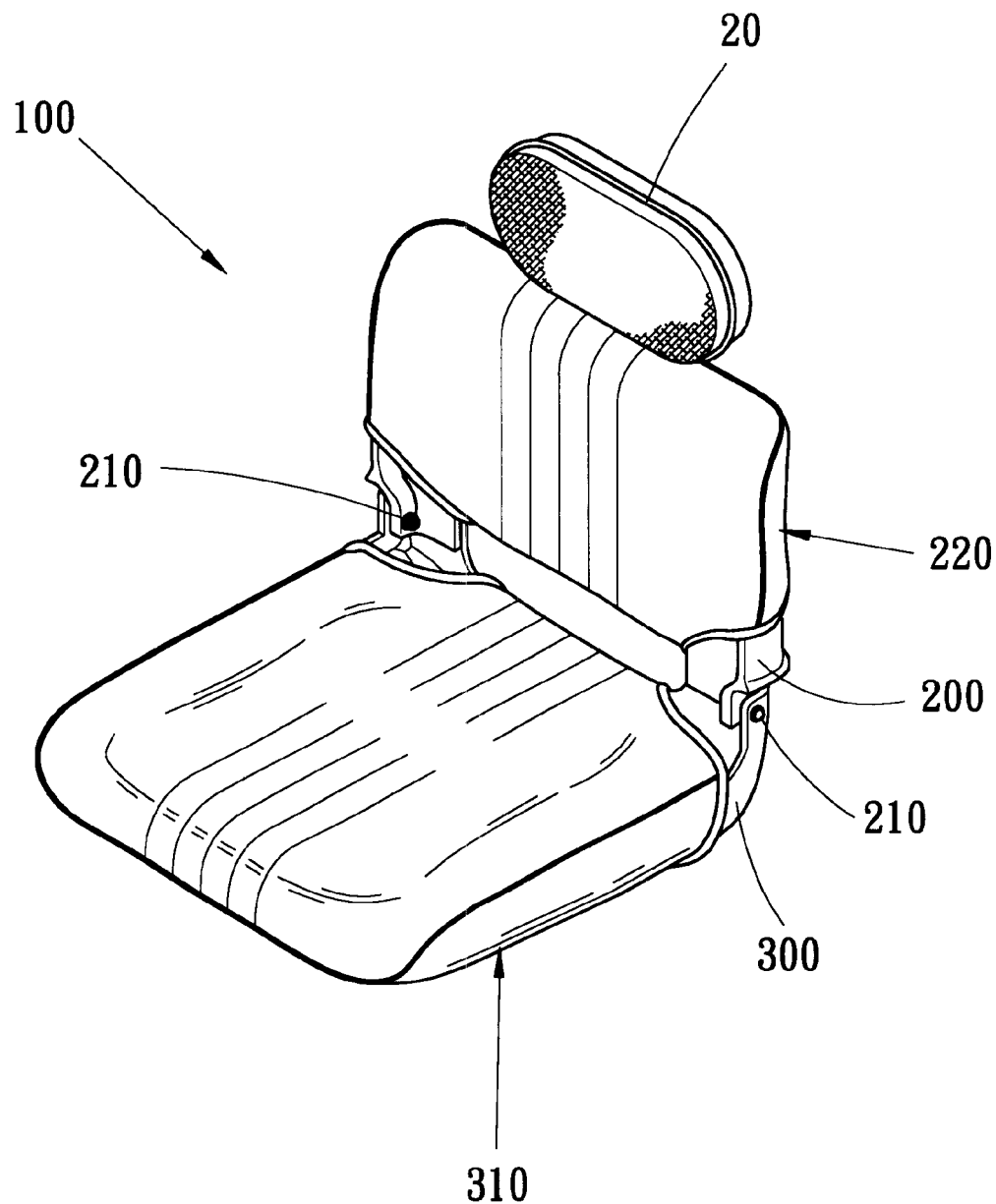
FIG. 1 is an assembled perspective of a simple-structured seat with the headrest according to a first embodiment of the present invention.

Please refer to FIGS. 1 through 4 in which a headrest according to a first embodiment of the present invention and a simple-structured seat onto which the headrest is mounted are shown. In the following drawings, the seat is generally denoted with a reference numeral of 100. As can be seen from FIG. 1, the seat 100 mainly includes a back 200 and a bottom 300 that are pivotally connected together via a set of pivot elements 210, such that the back 200 can be tilted forward to a folded position closely over the bottom 300 (see FIG. 8). There is an opening X left between the back 200 and the bottom 300 after the two parts are assembled together. A back cushion 220 consisting of back upholstery 230 and a back pad 240 and a bottom cushion 310 consisting of bottom upholstery 320 and a bottom pad 330 are associated with the back 200 and the bottom 300, respectively.

The headrest of the present invention mainly includes at least one pair of bar receivers 10 and at least a pillow 20.

The at least one pair of bar receivers 10 are mounted onto a rear side of the back 200 at predetermined positions. The bar receivers 10 may be of any profile. In this first embodiment, the bar receiver 10 each is formed from a thin metal sheet through punching with a mold, so that the bar receiver 10 has an n-shaped cross section with two laterally extended wing portions 11 (see FIGS. 3 and 4). A plurality of fixing holes 12 are provided on each wing portion 11, so that fastening means, such as screws A', may be threaded through the fixing holes 12 to mount the bar receiver 10 onto the rear side of the back 200 of the seat 100. It is understood the bar receivers 10 may be mounted onto the rear side of the back 200 in any acceptable known way. In the manner shown in FIG. 2, the back 200 is drilled to provide mounting holes 3A corresponding to the fixing holes 12 on the bar receivers 10. Otherwise, the bar receivers 10 may also be connected to the back 200 by directly threading the fastening means A' through the fixing holes 12 into the back 200 that is usually made of plastic material. In either way, an insertion hole 13 is defined between the back 200 and the bar receiver 10 mounted onto the back 200.

Figure 2:
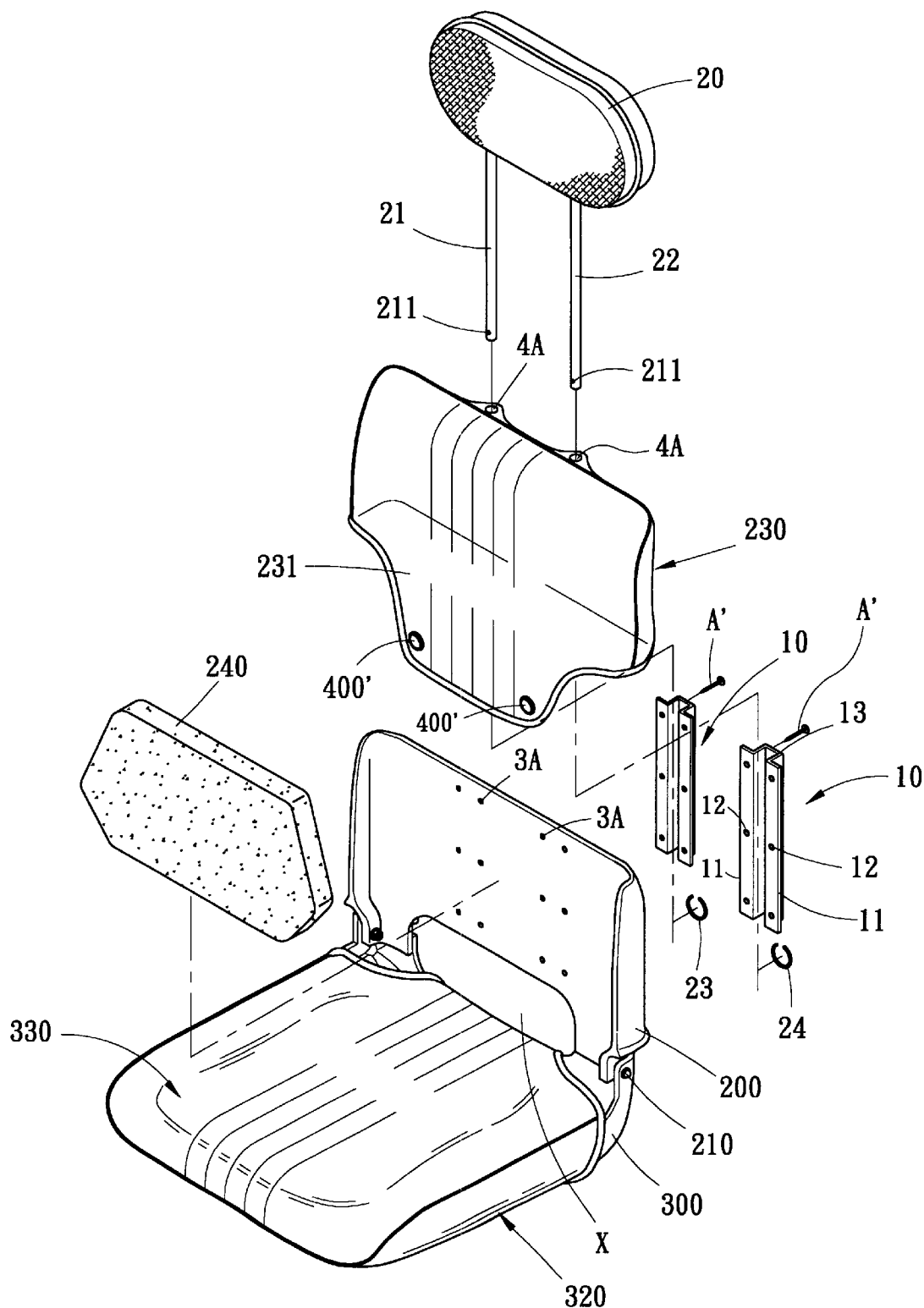
FIG. 2 is an exploded perspective of the seat and the headrest of FIG. 1.
Figure 3:
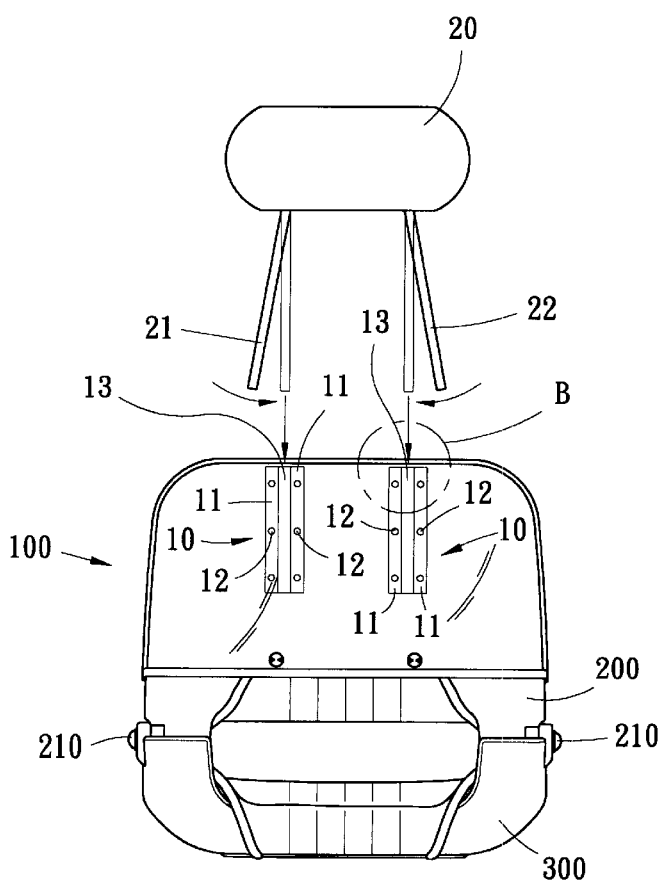
FIG. 3 is a rear view of the seat of FIG. 1, showing the manner in which the pillow of the headrest is associated with the bar receivers mounted on the back of the seat.
Figure 4:
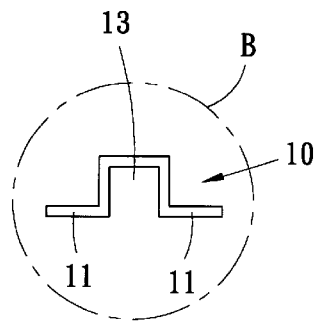
FIG. 4 is a partially enlarged sectional view of the circled portion B of FIG. 3.

The pillow 20 of the headrest may be of any shape. The pillow 20 includes at least one pair of downward projected elastic bars 21, 22 that are normally slightly outward inclined, as can be seen in FIG. 3. Both the elastic bars 21, 22 are provided near a lower end with a retaining slot 211, 221. The pillow 20 is connected to a top of the back 200 by inserting the two elastic bars 21, 22 into the two insertion holes 13 defined between the two bar receivers 10 and the rear side of the back 200. To do so, first apply an inward force on the two elastic bars 21, 22 and then align the two elastic bars 21, 22 with the two insertion holes 13 and push the pillow 20 downward. When the two elastic bars 21, 22 are located in the insertion holes 13, they automatically elastically extend outward to tightly press against inner walls of the insertion holes 13 and therefore firmly connect the pillow 20 to the back 200 via the bars 21, 22. After the bars 21, 22 have been extended through the insertion holes 13, C-rings 23, 24 are separately engaged into the retaining slots 211, 221 at the lower end of the bars 21, 22 to form stoppers on the bars 21, 22. A distance between the C-rings 23, 24 and lower ends of the bar receivers 10 defines a maximum range within which the pillow 20 is allowed to move relative to the back 200. The C-rings 23, 24 also prevent the bars 21, 22 from unexpectedly moving out of the bar receivers 10 to cause the pillow 20 to undesirably separate from the back 200. As can be seen in FIG. 2, at least one pair of holes 4A are provided at a top of the back upholstery 230 to conveniently guide the elastic bars 21, 22 into the insertion holes 13 in the bar receivers 10. It is understood that the elastic bars 21, 22 of the pillow 20 may have any cross section. In the illustrated drawings, the bars 21, 22 have round cross section. It is possible to provide axially extended teeth on outer surfaces of the bars 21, 22 to increase a grip between the bars 21, 22 and the bar receivers 10.

Figure 5:
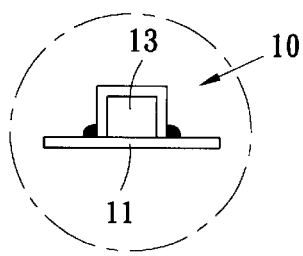
FIG. 5 is a sectional view of another embodiment of the bar receiver of the headrest of the present invention.
Figure 6:
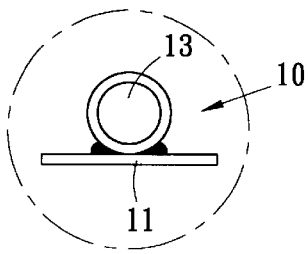
FIG. 6 is a sectional view of a further embodiment of the bar receiver of the headrest of the present invention.

FIGS. 5 and 6 illustrate another two embodiments of the bar receiver 10. In FIG. 5, the bar receiver 10 includes a metal flat fixing plate and an n-shaped metal channel welded to the fixing plate to form two wing portions 11 at two sides of the n-shaped channel and define an insertion hole 13 between the flat plate and the n-shaped channel. In FIG. 6, the n-shaped channel is replaced with a round metal tube. It is understood that metal channels or metal tubes of other cross section may also be used to replace the round tube to achieve the same function of receiving the bars 21, 22 therein.

Figure 7:
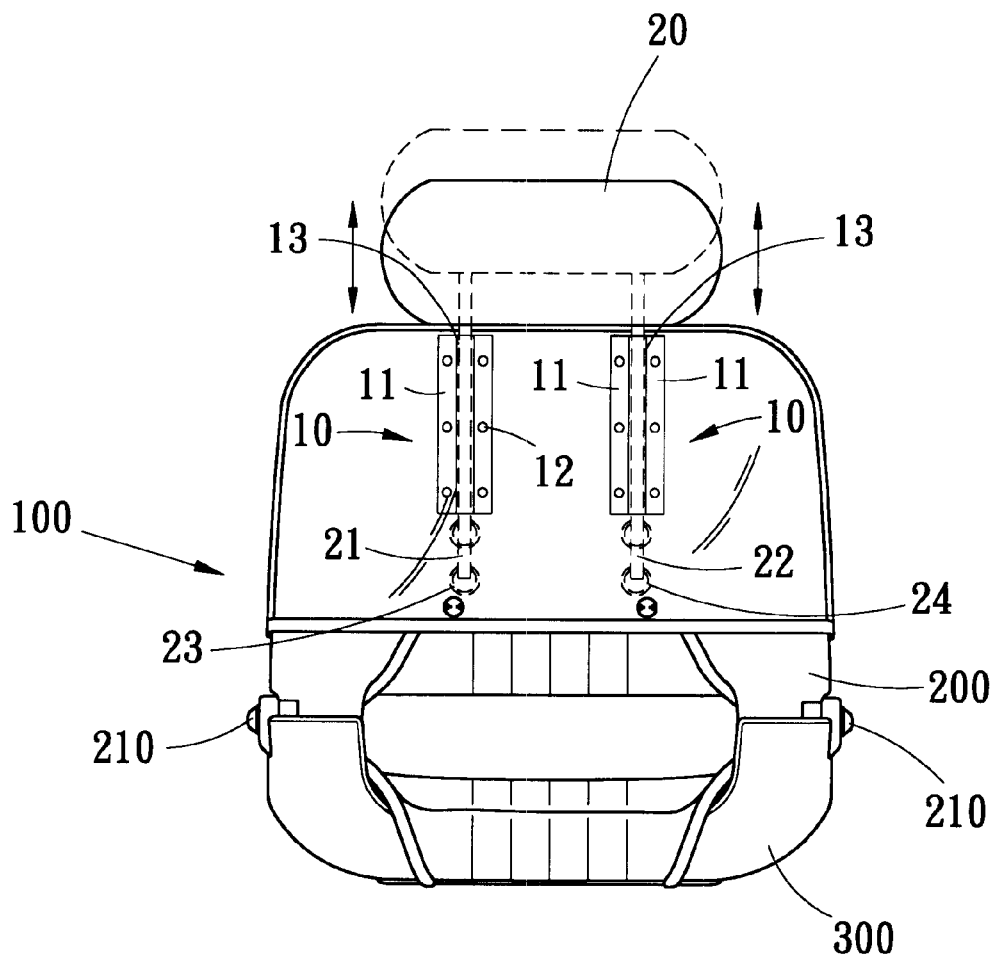
FIG. 7 a rear view of the seat of FIG. 1 showing the manner in which the pillow of the headrest is vertically adjusted relative to the back of the seat.

FIG. 7 is a rear view of the simple-structured seat 100 with the headrest of the present invention mounted thereonto. As can be seen in FIG. 7, the pillow 20 of the headrest is vertically adjustable in its position relative to the back 200 in order to meet the need of drivers of different heights. To do so, the pillow 20 is shifted up or down by sliding the elastic bars 21, 22 along linear tracks defined by the insertion holes 13 in the bar receivers 10, as indicated by the arrows in FIG. 7. The C-rings 23, 24, together define a maximum distance by which the pillow 20 of the headrest may be vertically moved upward relative to the back 200 and thereby prevent the pillow 20 from unexpectedly separating from the back 200.

Figure 8:
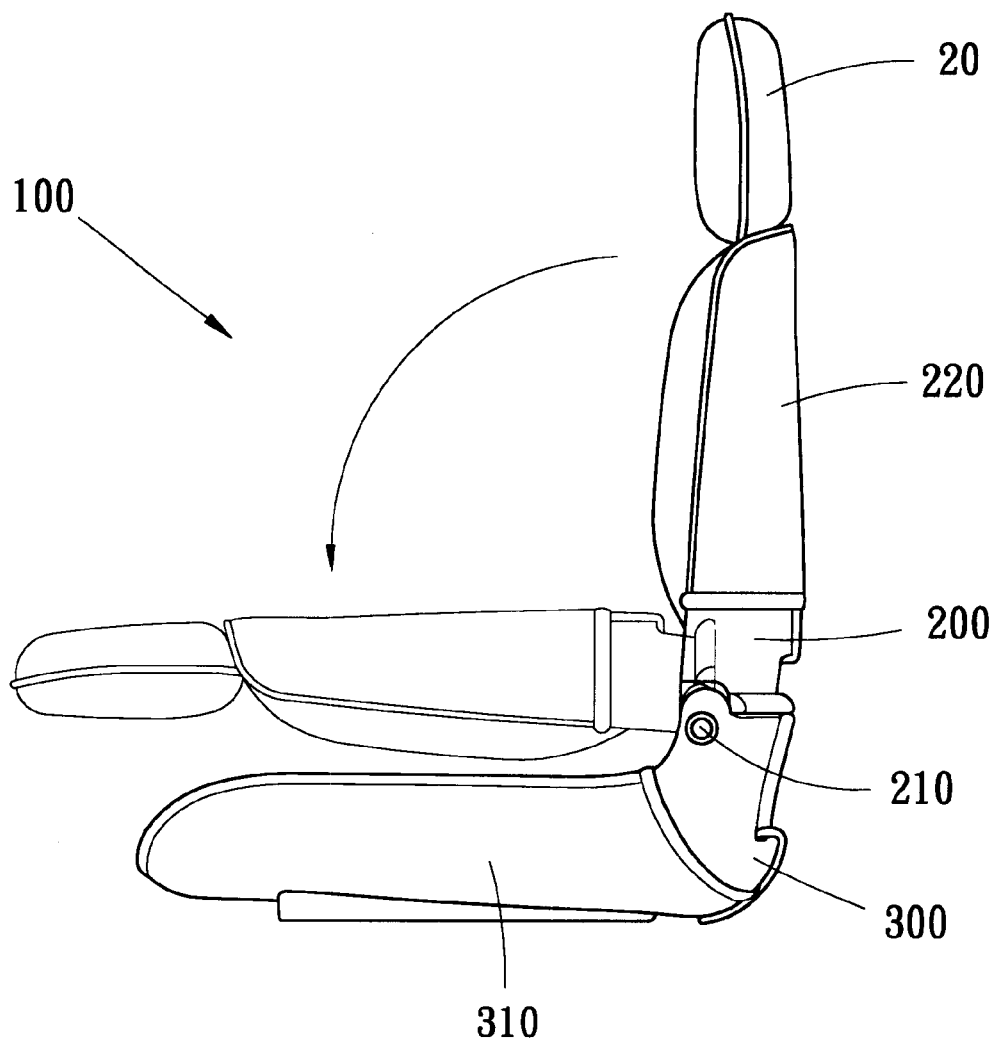
FIG. 8 is a side view of the seat of FIG. 1 showing the back thereof is adapted to tilt forward to a folded position closely above the bottom of the seat.

FIG. 8 shows that the back 200 of the seat 100 of the present invention can be tilted forward to a folded position. In this position, the back 200 is closely located above the bottom 300 to largely reduce the volume of the seat 100 and to facilitate convenient storage and/or conveyance of the seat 100.

Figure 9:
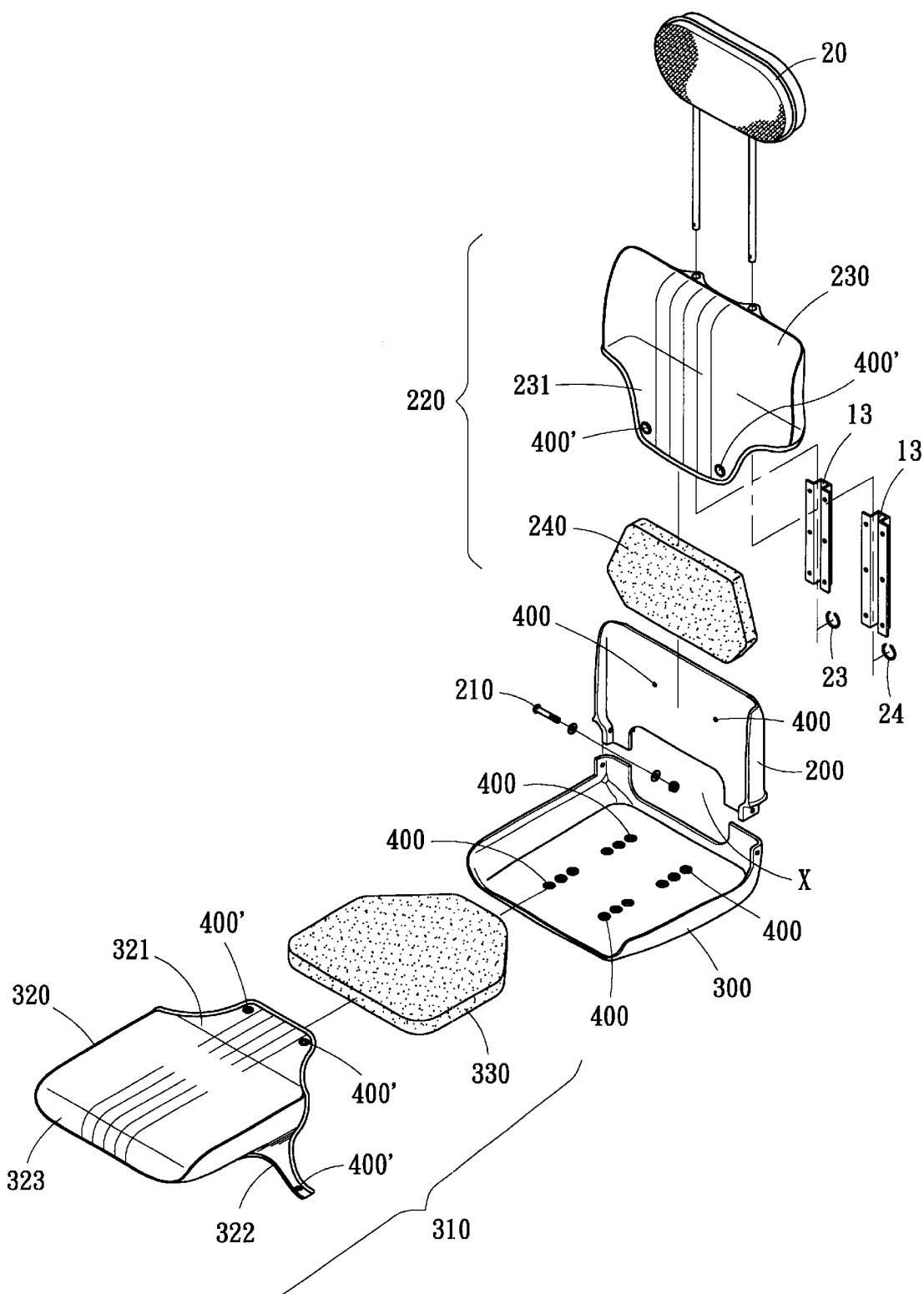
FIG. 9 is an exploded perspective showing the manner of connecting bottom cushion and back cushion to the bottom and the back, respectively, of the seat of the present invention.
Figure 10:
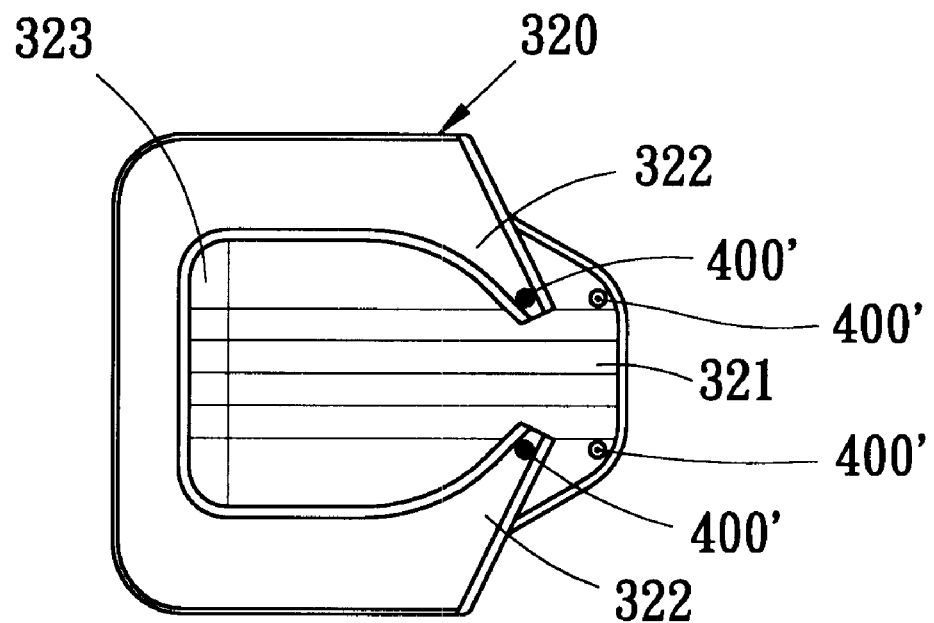
FIG. 10 is a bottom view of the bottom upholstery for the bottom of the seat of the present invention.
Figure 11:
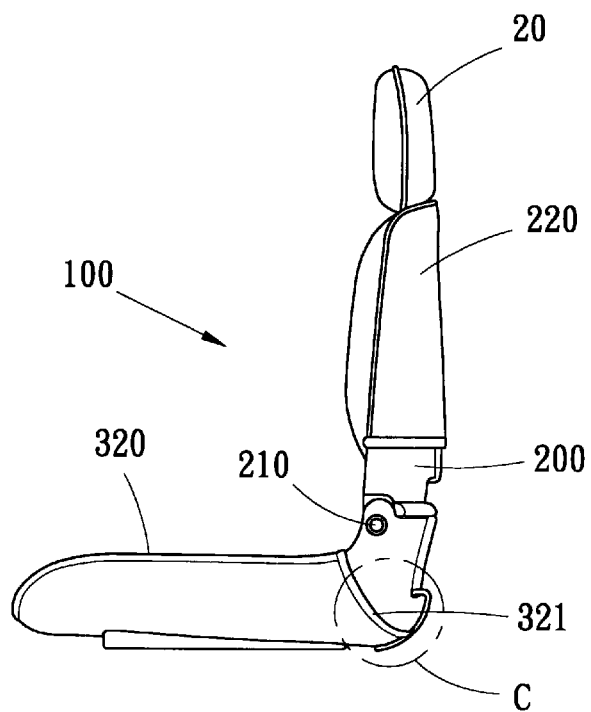
FIG. 11 is a side view showing the manner of connecting the bottom upholstery to the bottom of the seat of the present invention.
Figure 12:
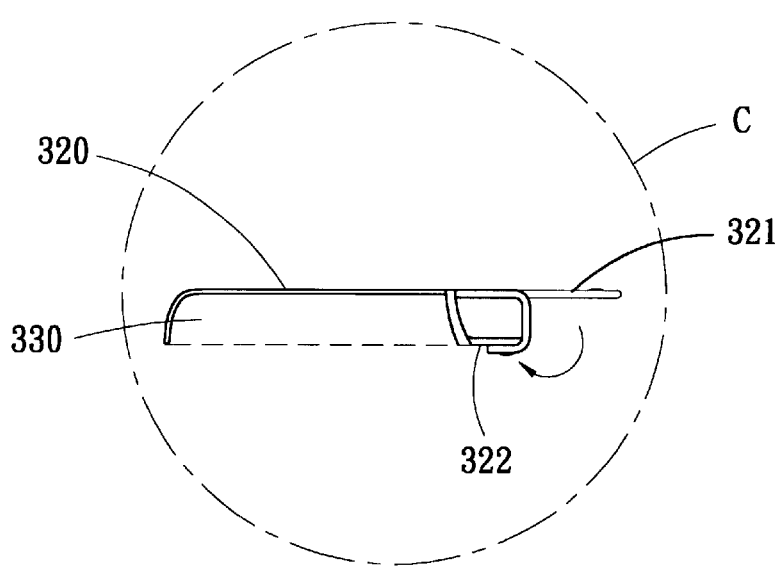
FIG. 12 is a partially enlarged view of the circled portion C in FIG. 11 showing a rear flap of the bottom upholstery is bent downward to connect to the bottom of the seat.
Figure 13:
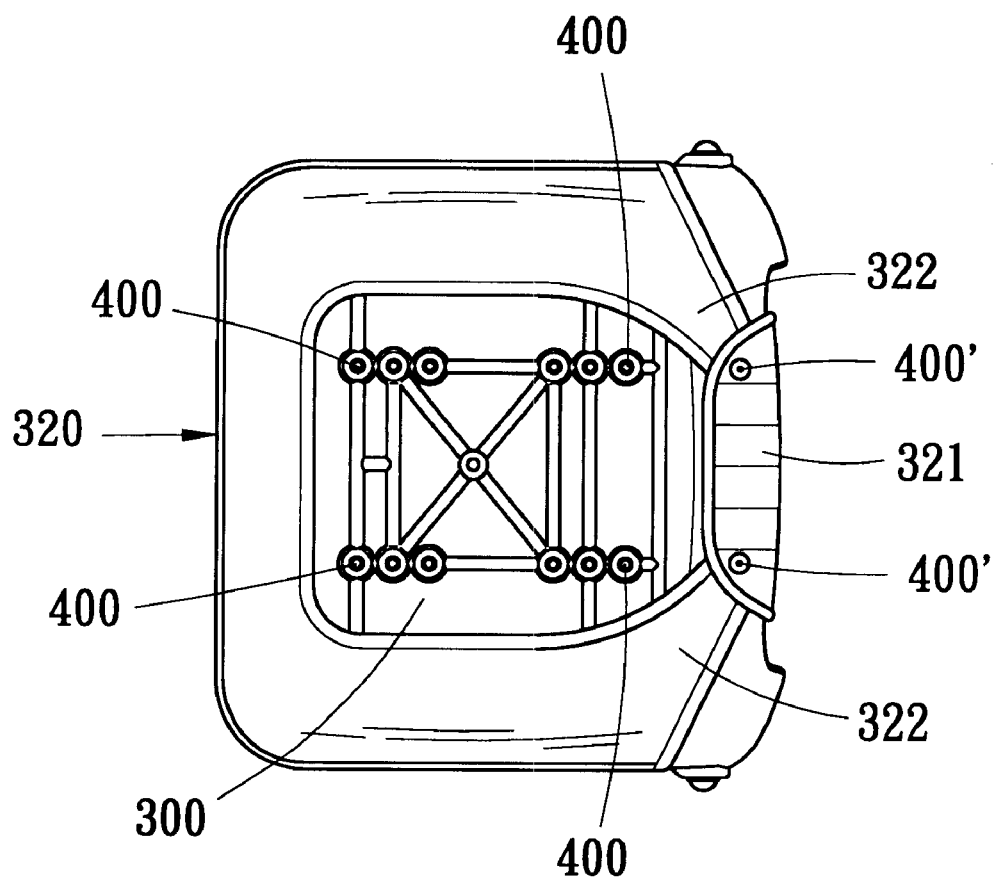
FIG. 13 is a bottom view of the seat of the present invention with the bottom upholstery of FIG. 10 connected to the bottom of the seat.
Figure 14:
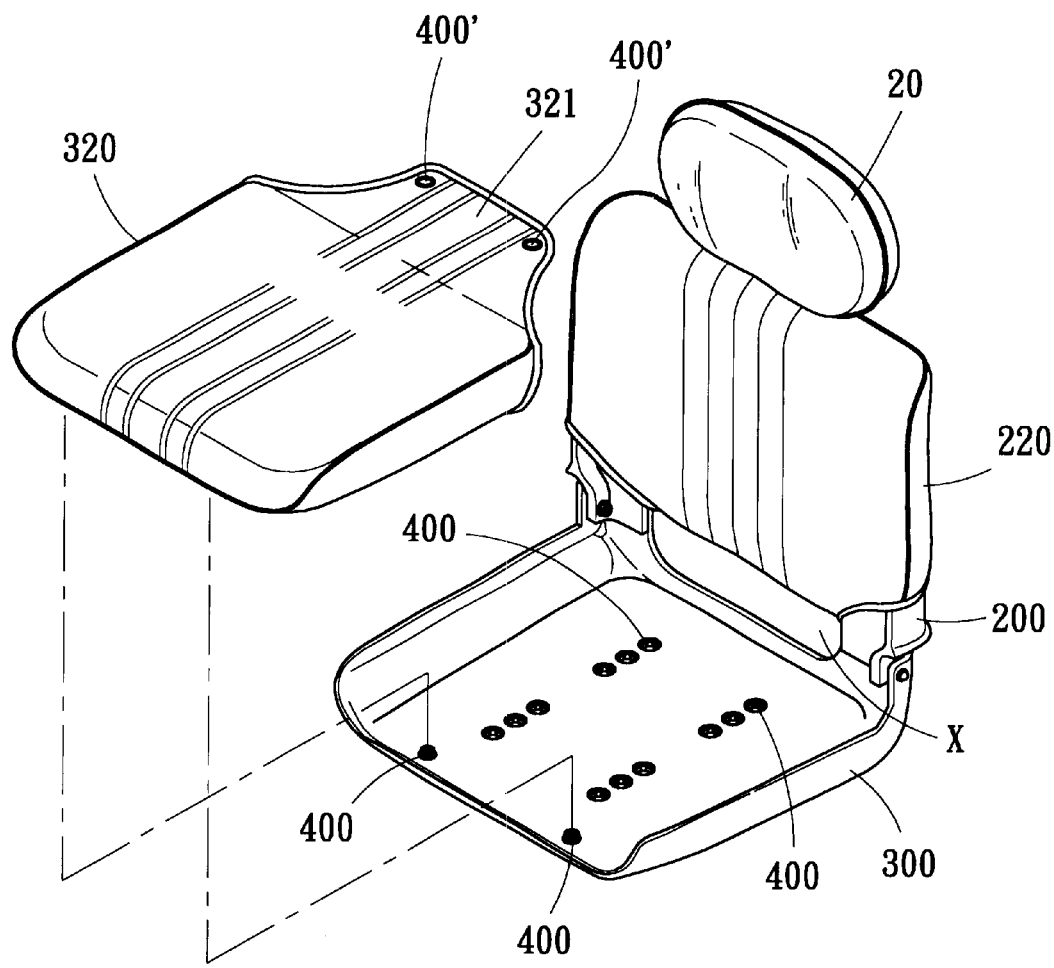
FIG. 14 shows another manner of connecting the bottom cushion to the bottom of the seat of the present invention.

In FIGS. 9 through 13, there is shown a first manner of connecting the bottom cushion 310 to the bottom 300 of the seat 100. As shown, both the back 200 and the bottom 300 of the seat 100 are provided at their inner and outer surfaces with a plurality of first fastening means 400. The bottom upholstery 320 defines a hollow space into which the bottom pad 330 is positioned. The bottom upholstery 320 includes an extended rear flap 321, of which both inner and outer surfaces are provided with a plurality of second fastening means 400', and two binding wings 322 separately extended from two sides of the bottom upholstery 320. The binding wings 322 are provided on outer surfaces near outer ends thereof with at least one second fastening means 400' each, as shown in FIG. 10. When the whole bottom cushion 310 is positioned onto a top of the bottom 300, the two binding wings 322 of the bottom upholstery 320 are adapted to be bent downward to attach to an underside of the bottom 300, as shown in FIG. 13. Thereafter, the rear flap 321 of the bottom upholstery 320 is extended through the opening X between the back 200 and the bottom 300, as shown in FIG. 9. The rear flap 321 is then further bent in a direction as indicated by the arrow in FIG. 12 to attach to the underside of the bottom 300. By attaching the second fastening means 400' on the inner surface of the rear flap 321 to the second fastening means 400' on the outer surfaces of the two binding wings 322, as shown in FIG. 13, the whole bottom cushion 310 is fixedly connected to the top of the bottom 300.

Figure 15:
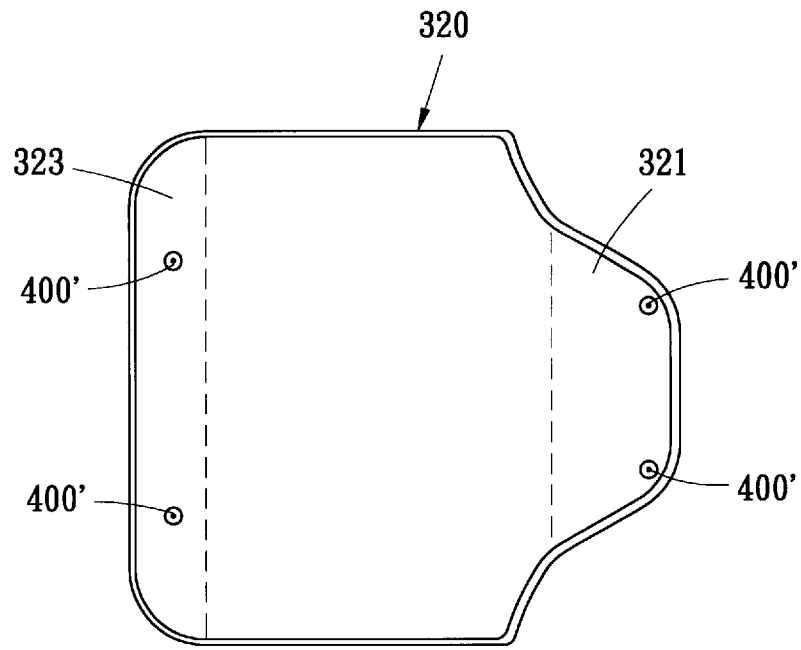
FIG. 15 is a bottom view of the bottom upholstery shown in FIG. 14.
Figure 16:
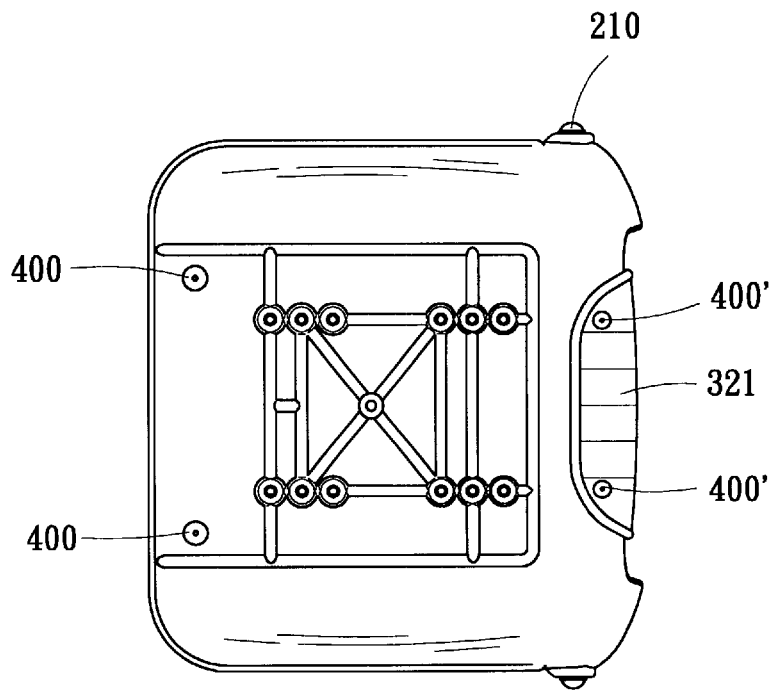
FIG. 16 is a bottom view of the seat of FIG. 14 with the bottom upholstery of FIG. 14 connected to the bottom of the seat of the present invention.
Figure 17:
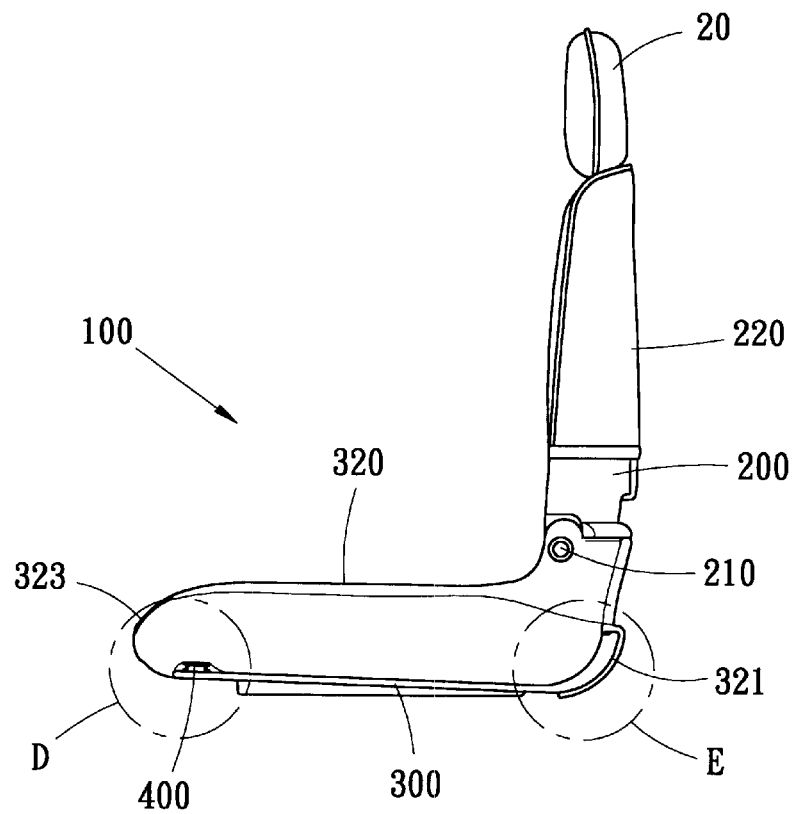
FIG. 17 is a side view showing the manner of connecting the bottom upholstery of FIG. 14 to the bottom of the seat of FIG. 14.
Figure 18:
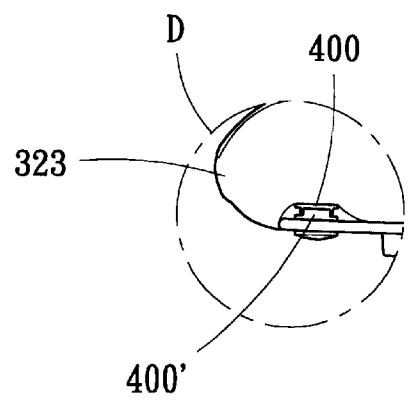
FIG. 18 is a partially enlarged view of the circled portion D in FIG. 17.
Figure 19:
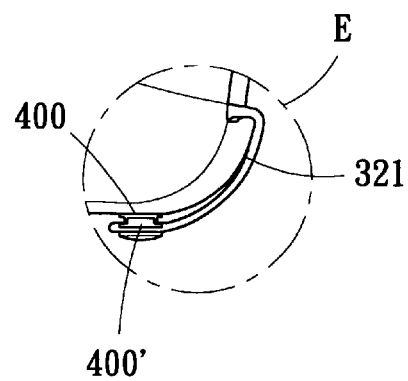
FIG. 19 is a partially enlarged view of the circled portion E in FIG. 17.

Please now refer to FIGS. 14 to 19. In these drawings, there is shown a second manner of connecting the bottom cushion 310 to the bottom 300 of the seat 100. To connect the bottom cushion 310 to the bottom 300 in this second manner, the bottom upholstery 320 is designed to include a rear flap 321 and a front flap 323. The binding wings 322 are omitted from the bottom upholstery 320 in this case. The rear flap 321 and the front flap 323 are provided at their inner surfaces with a plurality of second fastening means 400', as shown in FIG. 15. The second fastening means 400' on the front flap 323 are adapted to attach to first fastening means 400 provided on the top of the bottom 300, as shown in FIGS. 17 and 18. And, the rear flap 321 is adapted to extend through the opening X between the back 200 and the bottom 300 and to attach to the underside of the bottom 300 in the same manner as previously described in reference with FIG. 12, so that the second fastening means 400' on the rear flap 321 are connected to the first fastening means 400 on the underside of the bottom 300, as shown in FIGS. 16, 17 and 19. After all the second fastening means 400' on the bottom upholstery 320 have been connected to the first fastening means 400 on the top and the underside of the bottom 300, the bottom cushion 310 is firmly connected to the bottom 300.

Figure 20:
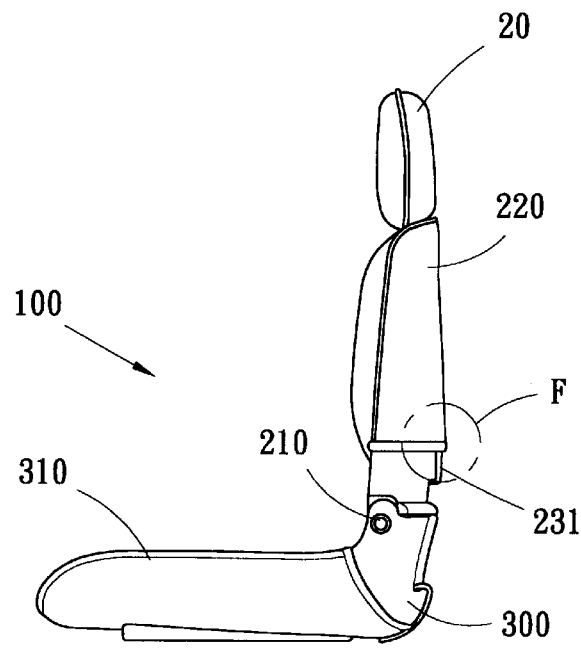
FIG. 20 is a side view showing the manner of connecting the back upholstery to the back of the seat of the present invention.
Figure 21:
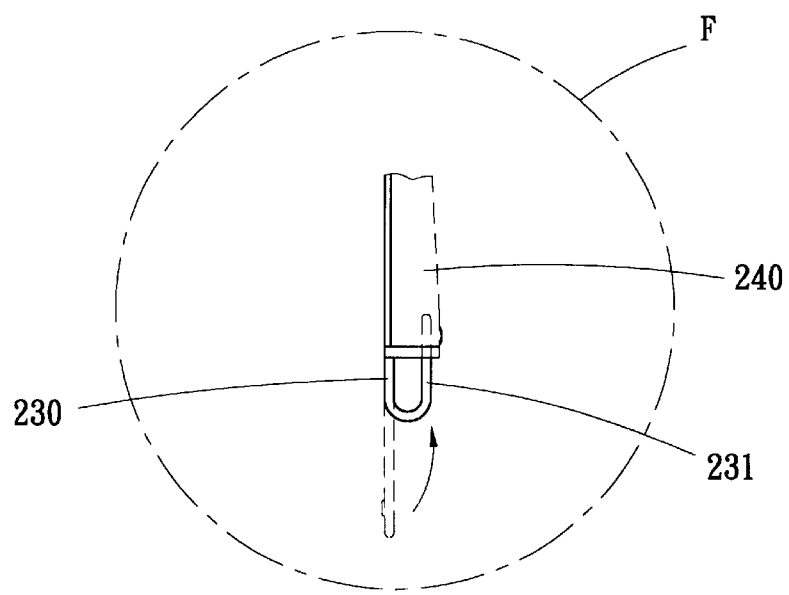
FIG. 21 is a partially enlarged view of the circled portion F in FIG. 20, showing the manner of fixing a lower flap of the back upholstery to the back of the seat.
Figure 22:
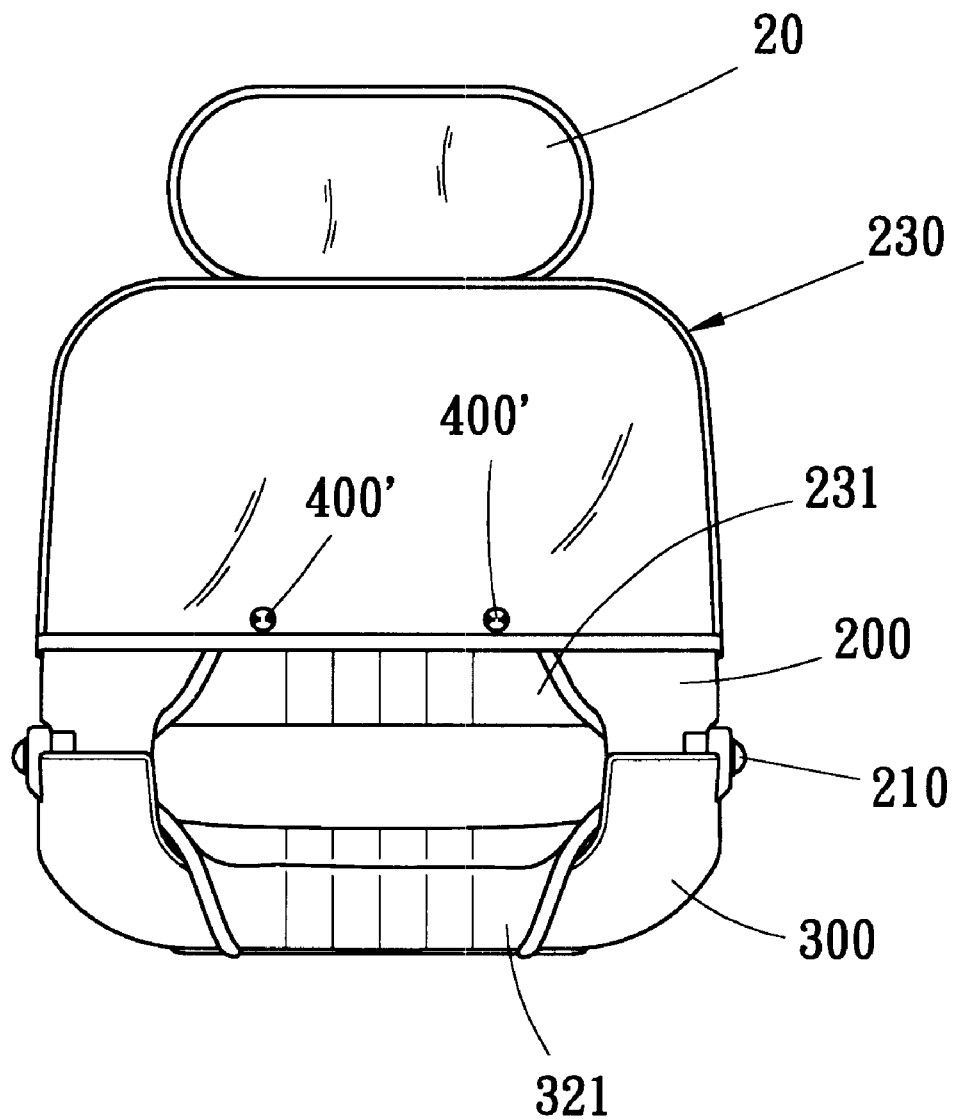
FIG. 22 is a rear view of the seat of the present invention with the back upholstery connected to the back of the seat.

In FIGS. 20 to 22, there is shown a manner of connecting the back cushion 220 to the back 200 of the seat 100. Please also refer to FIG. 9, the back upholstery 230 for the back cushion 220 defines a hollow space into which the back pad 240 is positioned. The back 200 is also received in the back upholstery 230. The back upholstery 230 includes a lower flap 231 on which there is provided with a plurality of second fastening means 400'. The lower flap 231 is adapted to extend through the opening X between the back 200 and the bottom 300 and bend upward to extend back into the back upholstery 230, as shown in FIG. 21. By attaching the second fastening means 400' on the lower flap 231 to second fastening means 400' provided in the back upholstery 230 near a lower edge thereof, as shown in FIGS. 20 and 21, the back cushion 220 is firmly connected to the back 200 of the seat 100.

Figure 23:
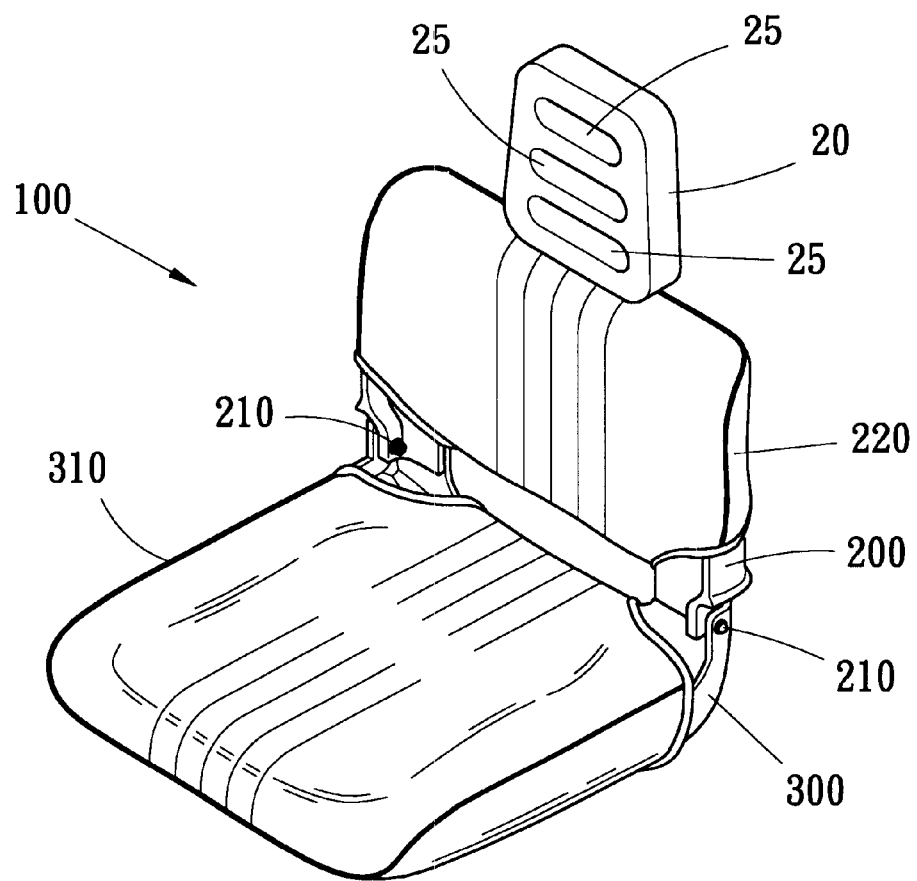
FIG. 23 is a perspective of a simple-structured seat of FIG. 1 having a headrest according to a second embodiment thereof connected thereto.

FIG. 23 shows a second embodiment of the pillow 20 for the headrest of the present invention. In this second embodiment, the pillow 20 is in a shape approximate to a trapezoid and is provided with a plurality of long openings to serve as air vents 25. With the air vents 25, the headrest is more comfortable for use.

Figure 24:
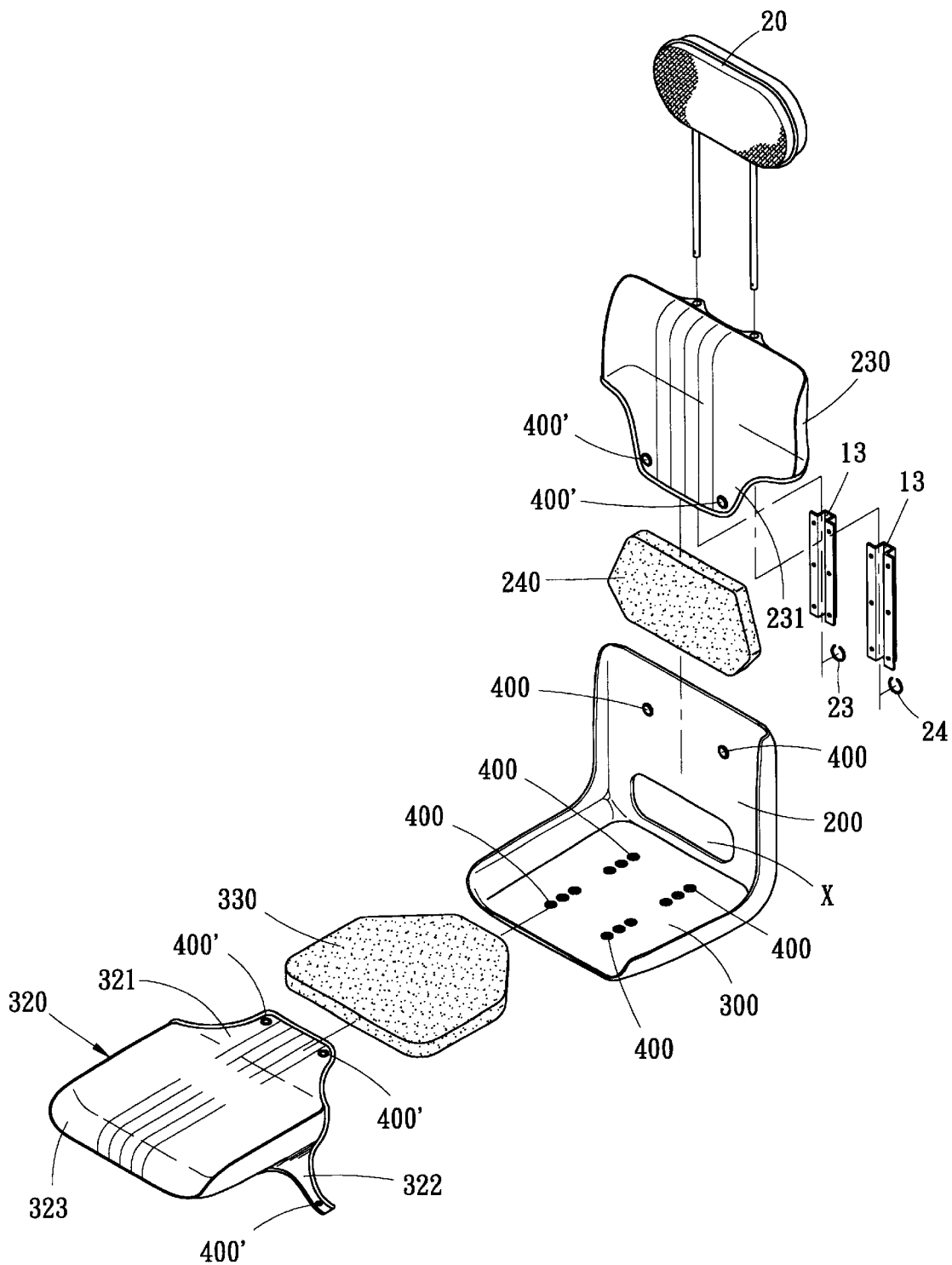
FIG. 24 is an exploded perspective of a headrest according to the present invention being mounted to a simple-structured seat according to a second embodiment thereof.
Figure 25:
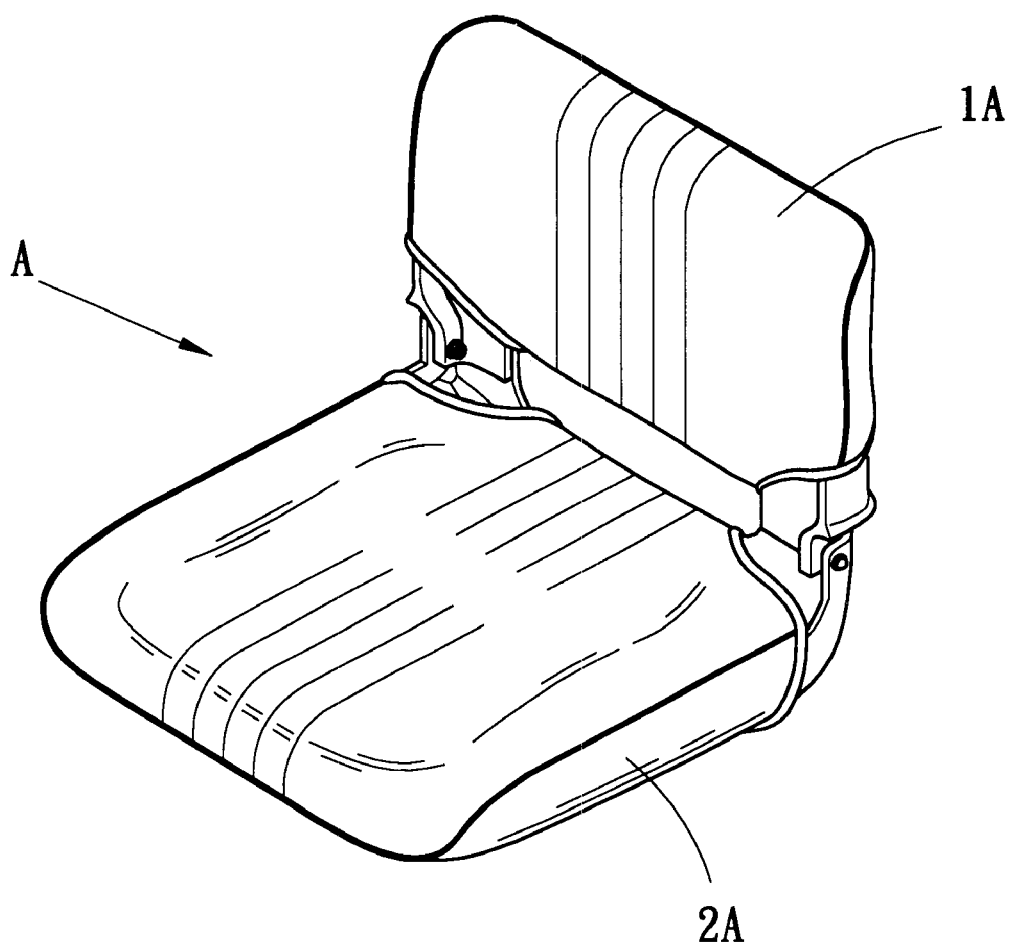
FIG. 25 is a perspective of a conventional seat for vehicles.

FIG. 24 shows another embodiment of the simple-structured seat 100 onto which the headrest of the present invention can be easily mounted, too. The seat 100 in this second embodiment is generally similar to the seat 100 of the first embodiment, except that the back 200 and the bottom 300 are perpendicularly to each other and are not pivotally movable relative to each other. The back cushion 220 and the bottom cushion 310 are connected to the back 200 and the bottom 300, respectively, in the same manner as described in reference with FIGS. 9 through 22. And, the bar receivers 10 could also be mounted to the back 200 of the seat 100 in this second embodiment in the same manners as described above.

The following are some of the advantages of the simple-structured seat 100 and the headrest mounted thereonto:

1. Since the headrest includes only a few simple components, including the at least one pair of bar receivers 10 and the at least one pillow 20, the whole headrest can be easily mounted onto the back 200 of the seat 100 to save a lot of time and labors.
2. The pillow 20 may have a variety of designs and the whole headrest may be sold as a DIY package. Users may select the headrest meeting their personal requirements or preference and mount the headrest onto the seat 100 completely by themselves in the simplest way without the assistance of a manufacturer or a skilled operator.
3. The headrest may be produced and sold as a package product that allows users to easily purchase a new whole set of headrest to mount onto an old seat that was not provided with a headrest. It is not necessary to design a new mold to manufacture a seat with a headrest incorporated therein. The manufacturing and selling costs of the seat 100 can therefore be largely reduced.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A headrest in combination with a simple-structured seat comprising:
   a seat back and a seat bottom connected to each other, and at least one pair of bar receivers and at least one pillow; wherein
   each of said bar receivers includes two laterally extended wing portions on which a plurality of fixing holes are provided to receive fastening means to fix said bar receivers at predetermined positions on a rear side of said back of said seat, such that an insertion hole is defined between each of said bar receivers and said back of said seat;
   said at least one pillow including at least one pair of downward extended elastic bars corresponding to said at least one pair of bar receivers, each pair of said elastic bars of said pillow elastically angled outward, such that said elastic bars are pressed inward to be inserted into said insertion holes, and said pair of elastic bars, after being inserted into said insertion holes and released, automatically elastically flex outward to tightly press against inner walls of said insertion holes to firmly connect said pillow of said headrest to said back of said simple-structured seat.

2. The headrest in combination with a simple-structured seat as claimed in claim 1, wherein:

said back and said bottom of said seat are pivotally connected to each other via a set of pivoting elements, such that said back tilts forward to a folded position above said bottom.

3. The headrest in combination with a simple-structured seat as claimed in claim 1, wherein:

said back and said bottom of said seat are fixedly connected to each other.

4. The headrest in combination with a simple-structured seat as claimed in claim 1, wherein:

said back and said bottom of said seat are connected to each other with an opening between said back and said bottom of said seat.

5. The headrest in combination with a simple-structured seat as claimed in claim 1, wherein:

said back and said bottom of said seat have a back cushion and a bottom cushion, respectively, connected thereto.

6. The headrest in combination with a simple-structured seat as claimed in claim 5, wherein:

said back cushion includes back upholstery and a back pad.

7. The headrest in combination with a simple-structured seat as claimed in claim 6, wherein:

said back is received in said back upholstery and wherein said back upholstery includes a lower flap that is provided at an outer surface with a plurality of fastening means and is adapted to extend through an opening between said back and said bottom and then upward into said back upholstery, and said fastening means provided on said lower flap are adapted to engage with fastening means provided on said back upholstery near a lower inner surface thereof to secure said back upholstery to said back.

8. The headrest in combination with a simple-structured seat as claimed in claim 6, wherein:

said back upholstery is provided at a top with at least one pair of holes corresponding to said at least one pair of bar receivers, so that said elastic bars of said pillow of said headrest are guided by said at least one pair of holes on said back upholstery into said insertion holes defined by said bar receivers.

9. The headrest in combination with a simple-structured seat as claimed in claim 5, wherein:

said bottom cushion includes bottom upholstery and a bottom pad.

10. The headrest in combination with a simple-structured seat as claimed in claim 9, wherein:

said bottom of said seat is provided on upper and lower surfaces with a plurality of first fastening means, and wherein said bottom upholstery includes a front flap and a rear flap, on both of which there are provided with a plurality of second fastening means; said second fastening means on said front flap of said bottom upholstery being adapted to engage with first fastening means provided on the upper surface of said bottom, and said rear flap of said bottom upholstery being adapted to extend through an opening between said back and said bottom to bend downward, such that said second fastening means on said rear flap are adapted to engage with said first fastening means provided on the lower surface of said bottom.

11. The headrest in combination with a simple-structured seat as claimed in claims 10, wherein:

said bottom upholstery is provided at two lateral sides with binding wings, each said binding wing is provided near an outer end thereof with at least one second fastening means; said binding wings being adapted to bond downward to locate below said bottom with said second fastening means thereon engaging with said second fastening means provided on said rear flap when said rear flap is extended through an opening between the back and the bottom and bent downward to locate below said bottom.

12. The headrest in combination with a simple-structured seat as claimed in claim 1, wherein:

said bar receivers are punched from thin metal sheets.

13. The headrest in combination with a simple-structured seat as claimed in claim 1, wherein:

each of said bar receivers includes a metal tube welded to a thin metal sheet, such that said thin metal sheet forms two laterally extended wing portions at two sides of said metal tube.

14. The headrest in combination with a simple-structured seat as claimed in claim 1, wherein:

said back of said seat is provided at said rear side with a plurality of mounting holes corresponding to said fixing holes on said wing portions of said bar receivers, whereby fastening means are inserted through said fixing holes into said mounting holes to connect said bar receivers of said headrest to said back of said seat.

15. The headrest in combination with a simple-structured seat as claimed in claim 1, wherein:

said pillow of said headrest has a trapezoid shape and is provided with a plurality of long openings that serve as air vents.

16. The headrest in combination with a simple-structured seat as claimed in claim 1, wherein:

each of said elastic bars downward extended from said pillow of said headrest is provided near a lower end thereof with a retaining slot for a C-ring to engage.

\* \* \* \* \*